(12) United States Patent
Arima

(10) Patent No.: US 6,316,844 B1
(45) Date of Patent: Nov. 13, 2001

(54) POWER SUPPLY FOR CONSUMING LOWER POWER IN A STANDBY MODE

(75) Inventor: Kenji Arima, Tokyo (JP)

(73) Assignee: LG Electronics, Inc., Seoul (KR)

( * ) Notice: Subject to any disclaimer, the term of this patent is extended or adjusted under 35 U.S.C. 154(b) by 0 days.

(21) Appl. No.: 09/578,725

(22) Filed: May 26, 2000

(30) Foreign Application Priority Data

May 27, 1999  (JP) .................................................. 11-147832

(51) Int. Cl.[7] ...................................................... H02J 7/00
(52) U.S. Cl. ................................................. 307/65; 307/64
(58) Field of Search .................................. 307/46, 66, 64, 307/65

(56) References Cited

U.S. PATENT DOCUMENTS

| | | | |
|---|---|---|---|
| 5,220,492 | * | 6/1993 | Rubin et al. ............................ 363/21 |
| 5,334,877 | * | 8/1994 | Mohan et al. ........................... 307/46 |
| 5,477,279 | | 12/1995 | Chang . |
| 5,657,215 | | 8/1997 | Faulk . |

FOREIGN PATENT DOCUMENTS 0875983   4/1998  (EP) .

* cited by examiner

Primary Examiner—Shawn Riley
(74) Attorney, Agent, or Firm—Birch, Stewart, Kolasch & Birch, LLP

(57) ABSTRACT

A standby power supply circuit with a low power consumption including: a voltage converter for rectifying a commercially used AC power source to convert it to a DC voltage; a standby power supplier for receiving the DC voltage from the voltage converter; a voltage comparator for comparing the DC voltage outputted from the voltage converter with pre-set reference voltages and outputting a predetermined pulse signal; and a switch unit for ON/OFF controlling the operation of the voltage converter according to a pulse signal outputted from the voltage comparator. With the construction, a zero cross switch is intermittently turned on or turned off, so that the standby transformer is turned on or turned off, by which the standby power can be reduced when the electric instruments are in a standby state.

14 Claims, 4 Drawing Sheets

POWER SUPPLY FOR CONSUMING LOWER POWER IN A STANDBY MODE

BACKGROUND OF THE INVENTION

1. Field of the Invention

The present invention relates to a standby power supply circuit with a low power consumption which is capable of reducing a power consumption of electric instruments in a standby state that is waiting for a signal to be outputted from a wireless remote-controller.

2. Description of the Background Art

FIG. 1 is a schematic block diagram of a standby power supply circuit in accordance with a conventional art.

With reference to FIG. 1, when a rectifier 101 receives a commercially used AC power source, rectifies it and outputs a DC voltage to a standby power supplier 104, the standby power supplier 104 which was in a standby state supplies the electric power to a relay driver 103, an infrared ray receiver 105 and a microcomputer 107. The relay driver 103 controls the ON/OFF operation of a relay 102.

When a user operates a remote controller 100 and a power-ON signal is outputted from the remote-controller 100, the infrared ray receiver 105 receives the power-ON signal and outputs it to the microcomputer 107. Then, the microcomputer 107 controls the relay 102 to be turned on or turned off through the relay driver 103, thereby outputting of the power supply of a main power supplier 106.

Generally, with regard to the electric instruments operated by the remote-controller, if no electric power is supplied to the electric instruments, the electric instruments are in a standby state until the power is supplied thereto. Furthermore, in order for the electric instruments to be readily switched from the OFF state or the standby state to the power-ON state, the electric instruments include the standby power supplier 104 for supplying the power in the standby state.

Accordingly, when the power-ON signal is outputted from the remote. controller as a user operates the remote-controller 100, the infrared ray receiver 105 receives the power-ON signal and outputs it to the microcomputer 107. Then, upon receipt of the power-ON signal, the microcomputer 107 controls the relay driver 103 or the main power supplier 106 so that electric power can be outputted from the main power supplier 106.

However, generally, the electric instruments are in a standby state for a longer time than in the operating time, so that more power is consumed in the standby state, leaving a task that the power consumed in the standby state of the electric instruments should be effectively reduced.

SUMMARY OF THE INVENTION

Therefore, an object of the present invention is to provide a standby power supply circuit with low power consumption, which is capable of reducing power consumption of electric instruments when the electric instruments are in a standby state.

To achieve these and other advantages and in accordance with the purpose of the present invention, as embodied and broadly described herein, there is provided a standby power supply circuit with a lower power consumption including: a voltage converter for rectifying a commercially used AC power source to convert it to a DC voltage; a standby power supplier for receiving the DC voltage from the voltage converter; a voltage comparator for comparing the DC voltage outputted from the voltage converter with pre-set reference voltages and outputting a predetermined pulse signal; and a switch for ON/OFF controlling the operation of the voltage converters according to a pulse signal outputted from the voltage comparator.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
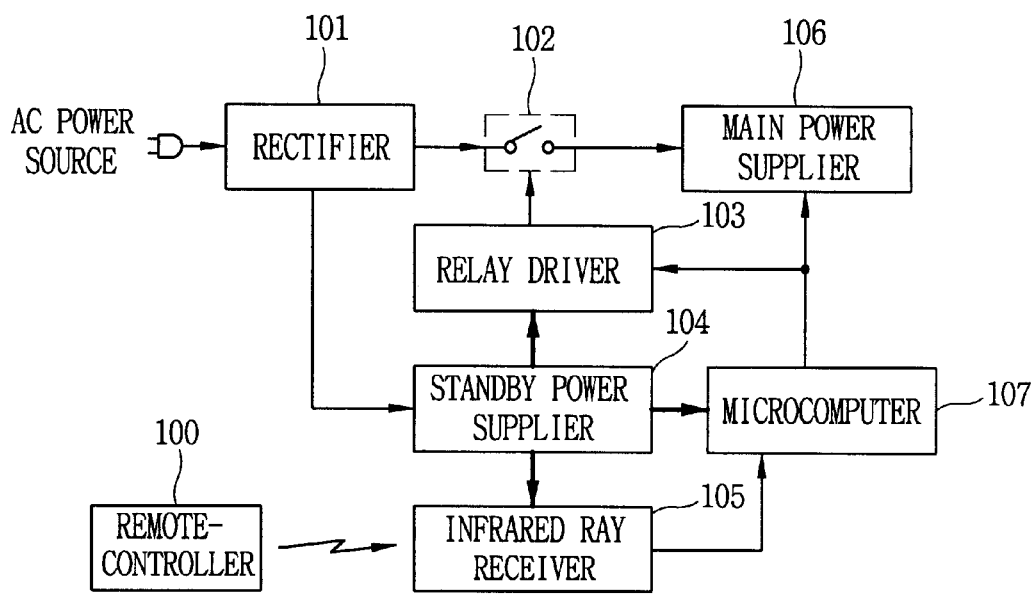
FIG. 1 is a standby power supply circuit including a standby power supplier in accordance with a conventional art.
Figure 2:
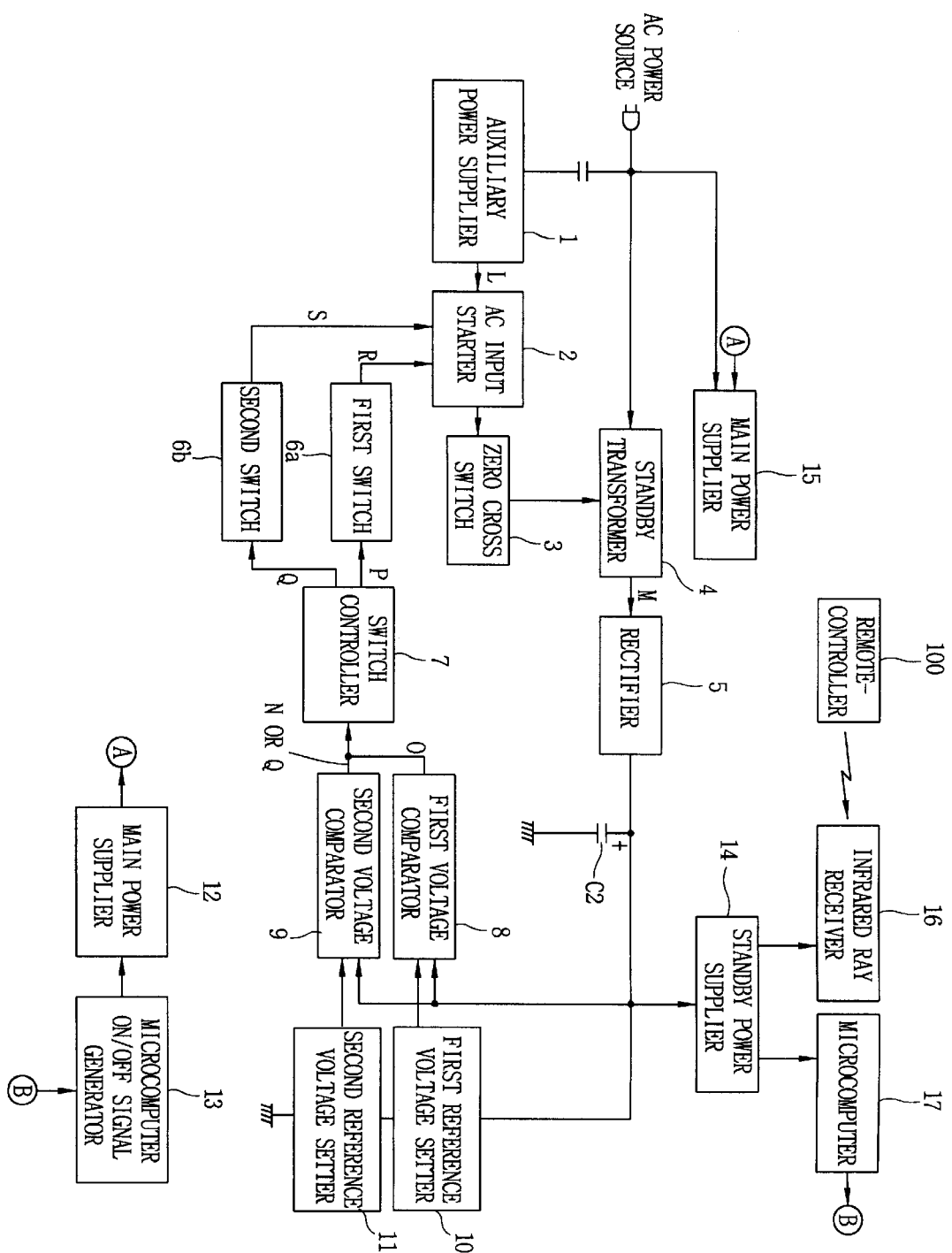
FIG. 2 is a standby power supply circuit in accordance with the present invention.
Figure 3:
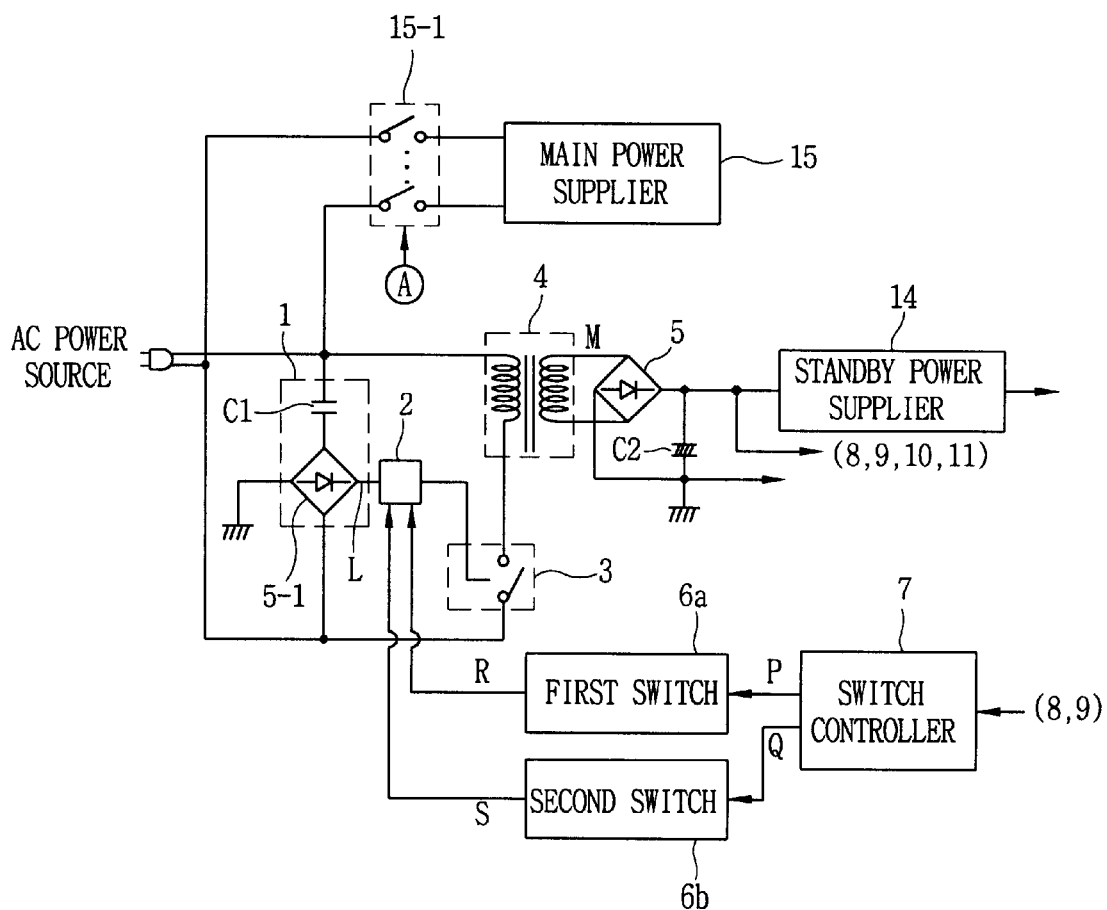
FIG. 3 is a detailed circuit diagram showing a primary part of FIG. 2 in accordance with the present invention.

FIG. 2 is a standby power supply circuit in accordance with the present invention; FIG. 3 is a detailed circuit diagram showing a primary part of FIG. 2 in accordance with the present invention; and FIGS. 4A through 4H are views showing a signal timing of each part of FIG. 2 in accordance with the present invention.

The present invention is directed to reduce a power consumption of electric instruments which are in a standby state.

With reference to FIG. 2, the DC voltage outputted through a rectifier 5 connected to a second side of the standby transformer 4 is compared with a pre-set reference voltage by the voltage comparators 8 and 9, and according to the comparison result, the first side of the standby transformer 4 (refer to FIG. 3) is ON/OFF controlled intermittently and the AC power source is intermittently supplied to the standby transformer 4, thereby reducing a power consumption of the standby power.

In detail, first a supply line at one side of the commercially used AC power source is connected to one side of the first side of the standby transformer 4, and a supply line at the other side of the AC power source is connected to the other side of the first side of the standby transformer 4 through the switch device 3 (i.e., zero cross switch).

Figure 4A:
FIGS. 4A through 4H are views showing a signal timing of each part of FIG. 2 in accordance with the present invention.

An auxiliary power supplier 1 rectifies the AC power source and outputs a DC voltage as shown in FIG. 4A 'L' to an AC input starter 2. The auxiliary power supplier 1 includes a capacitor C1 and a rectifier 5-1 (refer to FIG. 3). The AC input starter 2 provides the zero cross switch unit 3 with control signals (shown in FIGS. 4G 'R and 4H 'S') outputted from a first and a second switch units 6a and 6b (to be described).

Figure 4B:
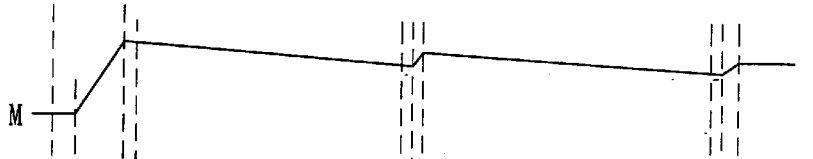
Figure 4C:
Figure 4D:
Figure 4E:
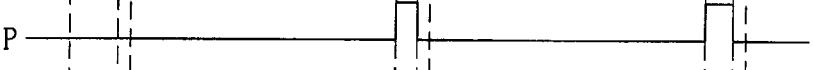
Figure 4F:
Figure 4G:

The control signal R of FIG. 4G represents ON/OFF state of the timer, and the ON period is set to a time during which the second voltage comparator 9 for monitoring the standby DC voltage level of the second side reaches a level enough to judge the voltage.

The AC input starter 2 includes a timer IC for supplying an initial electric power by operating the zero cross switch unit 3 for a predetermined time when a plug of the electric instrument is inserted into an AC socket.

Figure 4H:

The zero cross switch unit 3 is turned on or turned off with the timing of the control signal S of FIG. 4H by the AC input starter 2. That is, when the control signal S of FIG. 4H is ON, the AC power source is supplied to the first side of the standby transformer 4 and a predetermined voltage as shown in FIG. 4B (M) is outputted to the second side of the standby transformer 4. The outputted voltage is rectified by the rectifier 5 connected to the second side of the standby transformer 4, thereby generating a DC voltage. The DC voltage is provided to the standby power supplier 14, the first and the second voltage comparators 8 and 9 and the first and the second reference voltage units 10 and 11.

The first and the second voltage comparators 8 and 9 generate voltage pulse with the timing of 'O' of FIG. 4D, 'N' of FIG. 4C or 'Q' of FIG. 4F to the switch controller 7.

That is, if the DC voltage outputted from the rectifier 5 is lower than the reference voltage outputted from the first reference voltage unit 10, the first voltage comparator 8 generates a pulse with the timing of 'O' of FIG. 4D. Meanwhile, if the DC voltage outputted from the rectifier 5 is higher than the reference voltage outputted from the second reference voltage unit 11, the second voltage comparator 9 generates a pulse with the timing of 'N' of FIG. 4C or of 'Q' of FIG. 4F.

The first and the second reference voltage units 10 and 11 have such a circuit construction that a plurality of resistors (not shown) are connected in series so as to divide the DC voltage outputted from the rectifier 5. Upon receipt of the DC voltage outputted from the rectifier 5, the first and the second reference voltage units 10 and 11 take predetermined voltages from the common connection points between the resistors and output the first and the second reference voltages, respectively.

The switch controller 7 outputs the timing pulse 'P' of FIG. 4E and the timing pulse 'Q' of FIG. 4F to the first and the second switches 6a and 6b. That is, the timing pulse 'P' of FIG. 4E is outputted to the first switch 6a and the timing pulse 'Q' of FIG. 4F is outputted to the second switch 6b.

Here, the first and the second switches 6a and 6b may use photo couplers, and are inserted to insulate the first side and the second side through the AC input starter 2.

The operation of the standby power supply circuit constructed as described above will now be explained in more detail.

As the AC input starter 2 is controlled and the zero cross switch unit 3 is turned off, the electric power is cut off from supplying to the second side of the standby transformer 4 and the voltage of the standby power supplier 14 is lowered down according to the discharge voltage of a capacitor C2.

As the voltage of the standby power supplier 14 is dropped, when the voltage inputted to the first voltage comparator 8 is dropped lower than the pre-set voltage by the first reference voltage unit 10, the first voltage comparator 8 operates the AC input starter 2 through the first and the second switches 6a and 6b so as to turn on the zero cross switch unit 3. Accordingly, the voltage is outputted to the second side of the standby transformer 4 and then the DC voltage is outputted from the rectifier 5.

Meanwhile, the second voltage comparator 9 compares the second reference voltage outputted from the second reference voltage unit 11 and the standby voltage outputted from the standby power supplier 14. When the standby voltage reaches the pre-set reference voltage of the second reference voltage unit 11, the standby transformer 4 is turned off. Likewise, comparison is repeatedly performed by the first and the second voltage comparators 8 and 9, and according to the comparison result, the zero cross switch 3 is turned on or turned off, according to which the standby transformer 4 is intermittently turned on or turned off. When a microcomputer on/off signal generator 13 receives a signal from the microcomputer 17, generates a microcomputer ON/OFF signal and outputs to the main power supply driver 12, an actuating signal is outputted to the main power supply switch unit 15-1 (refer to FIG. 3).

As so far described, according to the standby power supply circuit with a low power consumption of the present invention, the zero cross switch 3 is intermittently turned on or turned off, so that the standby transformer 4 is turned on or turned off, by which the standby power can be reduced when the electric instruments are in a standby state.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalence of such meets and bounds are therefore intended to be embraced by the appended claims.

What is claimed is:

1. A standby power supply circuit having a low power consumption, comprising:
   a voltage converter for rectifying a commercially used AC power source to convert the AC power source to a DC voltage;
   a standby power supplier for receiving the DC voltage from said voltage converter;
   a voltage comparator for comparing the DC voltage output from said voltage converter with pre-set reference voltages and to output a predetermined pulse signal, said voltage comparator comprising:
      a first reference voltage setter for receiving the DC voltage from said voltage converter and for setting a first reference voltage;
      a second reference voltage setter for receiving the DC voltage from said voltage converter and for setting a second reference voltage;

a first voltage comparator for comparing the DC voltage output from said voltage converter with the first reference voltage, and for outputting a first pulse signal; and a second voltage comparator for comparing the DC voltage output from said voltage converter with the second reference voltage, and for outputting a second pulse signal; and a switch unit for controlling an ON/OFF operation of said voltage converter according to a pulse signal output from said voltage comparator.

2. The standby power supply circuit according to claim 1, wherein said voltage converter comprises:

a transformer for receiving the AC power source and converting the AC power source to a rectified voltage; and a rectifier for converting the rectified voltage output from the transformer to the DC voltage.

3. The standby power supply circuit according to claim 1, wherein said voltage comparator is controlled in such a manner that when the DC voltage is higher than the first reference voltage, said voltage converter is turned off, while when the DC voltage is lower than the second reference voltage, said switch unit is turned on, so as to turn on said voltage converter.

4. The standby power supply circuit according to claim 1, wherein said voltage comparator is controlled in such a manner that when the DC voltage is higher than the first reference voltage, said switch unit is turned off so as to turn off the power source being supplied to a first side of said voltage converter, while when the DC voltage is lower than the second reference voltage, said switch unit is turned on so as to turn on the power supplied to the first side of said voltage converter.

5. A standby power supply circuit having a low power consumption, comprising:

a voltage converter for rectifying a commercially used AC power source to convert the AC power source to a DC voltage;

a standby power supplier for receiving the DC voltage from said voltage converter;

a voltage comparator for comparing the DC voltage output from said voltage converter with pre-set reference voltages and to output a predetermined pulse signal; and a switch unit for controlling an ON/OFF operation of said voltage converter according to a pulse signal output from said voltage comparator, said switch unit comprising:

a switch controller for outputting a control signal according to the pulse signal output from said voltage comparator;

a first and a second switch for being turned on or turned off upon receipt of the control signal output from said switch controller;

an AC input starter for receiving the pulse signals generated according to the operation of said first and said second switches and for outputting a second pulse signal; and a third switch for controlling the ON/OFF operation of said voltage converter according to the operation of the AC input starter.

6. The standby power supply circuit according to claim 5, further comprising an auxiliary power supplier for receiving the AC power source and for supplying a DC voltage to said AC input starter.

7. The stand power supply circuit according to claim 5, wherein said AC input starter includes a timer for turning on a first side of said standby power supplier for a predetermined time when said AC power source is supplied.

8. A power supply system for a load device comprising:

a standby power unit for supplying operating power to the load device, said standby power unit having a first state in which power therefrom is supplied to the load device and a second state wherein power is not supplied to the load device;

a first switching unit for switching said standby power supply unit between the first and second states;

an auxiliary power supply unit for supplying a controlled amount of operating power to said first switching unit;

a detector unit for monitoring the voltage output of the auxiliary power supply unit;

a comparator unit for generating voltage regulation signals when the voltage output from said auxiliary power supply unit differs from a reference voltage; and a voltage control unit for activating or deactivating said auxiliary power supply to control a duty cycle thereof in response to the voltage regulation signals from said comparator unit.

9. The power supply system according to claim 8, wherein said auxiliary power supply unit comprises:

an auxiliary power supplier for rectifying AC power from an AC power source and outputting a DC voltage; and an input starter connected to said auxiliary power supplier and for supplying control signals to said first switching unit.

10. The power supply system according to claim 9, wherein said comparator unit comprises:

a first voltage comparator for receiving the voltage output from said auxiliary power supply unit and comparing the voltage output with a first reference voltage; and a second voltage comparator for receiving the voltage output from said auxiliary power supply unit and comparing the voltage output with a second reference voltage higher than said first reference voltage.

11. The power supply system according to claim 9, wherein said voltage control unit comprises:

a switch controller for receiving the voltage regulation signals from said comparator unit;

a first switch for supplying a first control signal to said auxiliary power supply unit to control said first switching unit to switch said standby power supply unit to the first state; and a second switch for supplying a second control signal to said auxiliary power supply unit to control said first switching unit to switch said standby power supply unit to the second state.

12. The power supply system according to claim 8, wherein said voltage control unit comprises:

a switch controller for receiving the voltage regulation signals from said comparator unit;

a first switch for supplying a first control signal to said auxiliary power supply unit to control said first switching unit to switch said standby power supply unit to the first state; and a second switch for supplying a second control signal to said auxiliary power supply unit to control said first switching unit to switch said standby power supply unit to the second state.

13. The power supply system according to claim 8, wherein said comparator unit comprises:
   a first voltage comparator for receiving the voltage output from said auxiliary power supply unit and comparing the voltage output with a first reference voltage; and
   a second voltage comparator for receiving the voltage output from said auxiliary power supply unit and comparing the voltage output with a second reference voltage higher than said first reference voltage.

14. The power supply system according to claim 13, wherein said voltage control unit comprises:
   a switch controller for receiving the voltage regulation signals from said first and second comparators;
   a first switch for supplying a first control signal to said auxiliary power supply unit to control said first switching unit to switch said standby power supply unit to the first state; and
   a second switch for supplying a second control signal to said auxiliary power supply unit to control said first switching unit to switch said standby power supply unit to the second state.

* * * * *